United States Patent [19]
Petty

[11] Patent Number: 6,026,467
[45] Date of Patent: Feb. 15, 2000

[54] CONTENT-ADDRESSABLE MEMORY IMPLEMENTED WITH A MEMORY MANAGEMENT UNIT

[75] Inventor: Norman W. Petty, Boulder, Colo.

[73] Assignee: Lucent Technologies Inc., Murray Hill, N.J.

[21] Appl. No.: 08/942,190

[22] Filed: Oct. 1, 1997

[51] Int. Cl.$^7$ ................................................ G06F 12/00
[52] U.S. Cl. ........................ 711/108; 711/205; 711/207
[58] Field of Search .................................. 711/108, 205, 711/207; 365/49

[56] References Cited

U.S. PATENT DOCUMENTS

| | | | |
|---|---|---|---|
| 5,414,704 | 5/1995 | Spinney | 370/389 |
| 5,712,998 | 1/1998 | Rosen | 711/205 |
| 5,749,087 | 5/1998 | Hoover et al. | 711/108 |
| 5,805,490 | 9/1998 | Machida | 708/700 |
| 5,835,962 | 11/1998 | Chang et al. | 711/206 |
| 5,893,930 | 4/1999 | Song | 711/205 |

OTHER PUBLICATIONS

T. Weldon, *Content-Addressable Memories Add Processing Power to Embedded Systems,* EDN, May 9, 1996, pp. 137–148.

PPC403GC Embedded Controller User's Manual, IBM, Ver 0.56, Oct. 25, 1995, pp. 1–3–1–13, 8–1–8–13, 9–1–9–27, & 11–168–11–174.

MU9C2480A Lancam®, Music Semiconductors, Rev. 0.2 Draft, Apr. 4, 1996, pp. 1–24.

*Primary Examiner*—John W. Cabeca
*Assistant Examiner*—Christopher S. Chow
*Attorney, Agent, or Firm*—David Volejnicek

[57] ABSTRACT

A content-addressable memory (CAM) is implemented by using otherwise-unused memory management unit (MMU 102) and cache memories (104, 105) of a program-controlled microprocessor (100). A program stored in an instruction cache (104) and executed by the microprocessor causes the microprocessor to respond to receipt of a word of data (200), which is illustratively the VPI/VCI of an ATM network connection, by applying the most-significant bits (MSBs 202) of the received word as a comparand to tags (203) of entries (206) of a fully-associative translation buffer (103) of the MMU to obtain an index (204) indicative of which translation buffer entry's corresponding tag matches the comparand. The program further causes the microprocessor to respond to obtaining of the index by concatenating the index with the least-significant bits (LSBs 201) of the received word to form a memory address of a data cache (105) which stores a plurality of records (210) and apply the address to the data cache to retrieve the addressed record, which is illustratively the path of the connection through the ATM network. Entries may be added to and deleted from the translation buffer during processing as needed.

21 Claims, 4 Drawing Sheets

6,026,467

CONTENT-ADDRESSABLE MEMORY IMPLEMENTED WITH A MEMORY MANAGEMENT UNIT

TECHNICAL FIELD

This invention relates to memory architecture.

BACKGROUND OF THE INVENTION

A content-addressable memory (CAM), also known as an associative memory, is a hardware implementation of associative processing. Associative processing manipulates data based on matching, or associating, an input value with other values stored in an array. Associative-processing hardware incorporates a limited amount of computational capability at each memory location that allows the entire memory array to be examined at once. CAMs combine these functions with a control structure to perform associative processing. A CAM compares an input value, the comparand, to all the associative data stored in the memory array at once. The output from a CAM can be a flag that indicates one or more matches and/or associated data that is related in some way to the matched values.

A CAM makes it possible to handle list searches and data translation as embedded functions within a system. The combination of a CAM and a state machine creates an economical controller for real-time processes that need to perform look-ups, data translations, and entry maintenance in sparsely populated tables—ones with few entries compared to the address space required for direct table look-up. For example, an asynchronous transfer mode (ATM) switch must search internal tables that hold the necessary information for each connection that routes through the switch. The index to these tables is the virtual-path identifier (VPI) for the VPI/virtual channel identifier (VCI) combination from the header of an incoming data cell. The switch uses this information to look up the VPI and VCI for the outgoing link, the internal path through the switch to the correct output port, billing rates, traffic-flow parameters, flags for any special functions, etc. A CAM is particularly suited for such an application.

A CAM is implemented as a circuit—often as an integrated-circuit device—and as such it adds to the cost of a system which employs the CAM. At the same time, the system may employ one of many commercially-available microprocessors and microcontrollers that include internal cache memories and control, as well as internal memory management units (MMUs), that use associative processing for cache line control and memory-management address-translation. And in many embedded applications, the MMU is not used.

One alternative to the use of a CAM is to use software-based linear and binary table searches. Since these searches are implemented in software, they dispense with the need for a dedicated circuit to perform these functions. But such searches require extensive shuffling of the data list to add or delete data entries. To add an item of data to a sorted data list, every entry from the end of the data table to the location of the new entry must be read and then written into the next location. Removal of an entry requires the same process in reverse. Search times depend on the size of the data list.

SUMMARY OF THE INVENTION

This invention is directed to solving these and other problems and disadvantages of the prior art. Generally according to the invention, the otherwise-unused MMU, and preferably also the otherwise-unused cache memories, of a microcontroller or microprocessor is used to implement a CAM. The MMU is used directly as an associative store using an MMU table search to perform the association. For applications that use more entries than the MMU associative store contains, a two-stage process comprising an associative search followed by a software search (generally an index-table search) associates a comparand with the appropriate value. A non-MMU association uses the cache memory with associated values stored in the data cache to perform similarly to the MMU association.

Specifically according to the invention, a CAM is implemented by a first memory and a microprocessor's internal MMU and program execution unit, and the first memory and the MMU are operated as a CAM under programmed control of the microprocessor. The internal MMU includes a translation buffer in the form of an associative second memory that has a plurality of entries, and each entry has a corresponding tag. The program execution unit is programmed to be responsive to receipt of a word of data, comprising most-significant bits and least-significant bits, by applying the most-significant bits as a comparand to the tags to obtain an index indicative of which translation buffer entry's corresponding tag matched the comparand, and is further programmed to be responsive to obtaining of the index by combining (e.g., concatenating) the index with the least-significant bits of the received word to form an address of the first memory. The first memory illustratively comprises a plurality of addressable records, and the program execution unit forms the address for application to the first memory to retrieve a record that is addressed by the address. Preferably, the first memory is an internal memory of the microprocessor, such as a data cache. Also preferably, the program execution unit includes an internal memory of the microprocessor, such as an instruction cache, for storing the program for execution by the program execution unit.

Advantageously, this combination of software and memory management hardware achieves the associative processing performance of either a CAM or a direct-index look-up table memory without the costs associated with either an external CAM or sufficient memory for a fully-populated direct-index look-up table. By also employing the cache hardware, the preferred implementation avoids the use of an external bus for external memory accesses and thereby achieves higher performance than an external CAM, yet does so at the cost of a software-only implementation.

These and other advantages and features of the invention will become more apparent from the following description of an illustrative embodiment of the invention considered together with the drawing.

DETAILED DESCRIPTION

Figure 1:
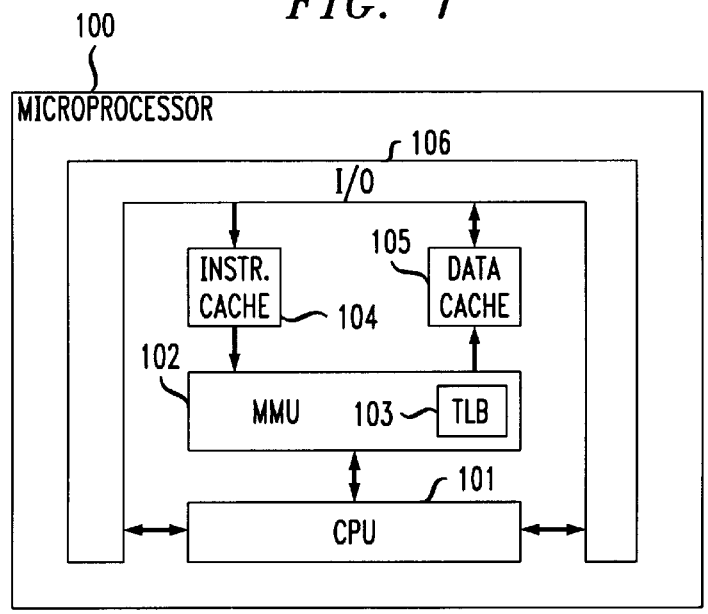
FIG. 1 is a block diagram of a microprocessor which includes an illustrative embodiment of the invention.

FIG. 1 shows an illustrative microcontroller or microprocessor 100 which implements an illustrative embodiment of the invention. Microprocessor 100 has a conventional construction comprising a central processing unit (CPU) 101 for executing program instructions, a memory management unit (MMU) 102 including a fully-associative translation buffer 103 for performing virtual-to-physical address translation; an instruction cache 104 for caching program instructions for execution by CPU 101, a data cache 105 for caching data for use by and data generated by CPU 101, and input and output (I/O) circuitry 106 for connecting elements 101, 104, and 105 to the outside world. Microprocessor 100 is illustratively the IBM PPC403GC embedded controller, in which case translation buffer 103 is a translation lookaside buffer (TLB).

TLB 103 is the hardware resource that normally controls address translation and protection functions. It comprises a plurality of entries—illustratively 64—each normally specifying a page to be translated. TLB 103 is fully associative, meaning that a given page entry can be placed anywhere in TLB 103. The establishment and replacement of TLB 103 entries is managed by software.

According to the invention, MMU 102 and its TLB 103 are used in combination with software executed by CPU 101—and illustratively also in combination with caches 104–105—to achieve the associative processing performance of a CAM or a fully-populated direct-index look-up table, without either the costs associated with an external CAM or the amount of memory needed for a fully-populated direct-index lookup table. This combination of processor hardware and software achieves higher performance than an external content-addressable memory at only the cost of a software-only solution.

Figure 2:
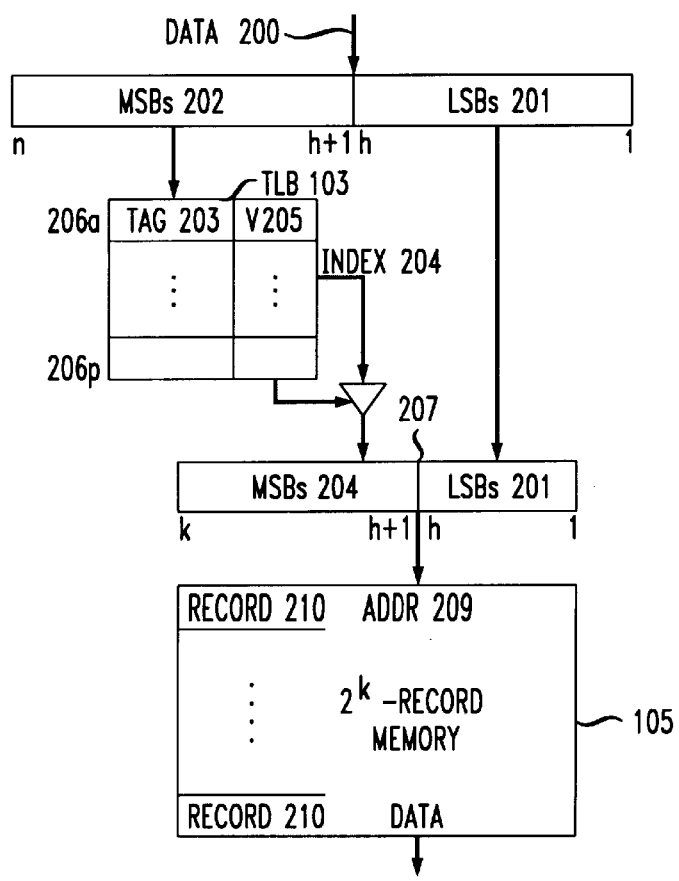
FIG. 2 is a block diagram of a content-addressable memory (CAM) function performed by the microprocessor of FIG. 1.

The CAM function effected by MMU 102 under control of software executed by CPU 101 is illustrated in FIG. 2. Illustratively, the software executed by CPU 101 is stored in instruction cache 104. MMU 102 receives an n-bit data word 200, which in this illustrative example is a 24-bit VPI/VCI of an ATM system. Data word 200 comprises h—illustratively 5—least significant bits (LSBs) 201 and (n–h) most significant bits (MSBs) 202. MMU 102 uses MSBs 202 as a comparand, simultaneously matching MSBs 202 against tag portions 203 of all entries 206a–206p of TLB 103. If an entry 206 having a tag 203 that matches MSBs 202 is found and a validity (V) bit 205 of that matching TLB entry 206 is set (indicating a valid entry), an index 204 into TLB 103 that indicates which one of the p entries 206 matched is output by TLB 103 and is concatenated with LSBs 201 of the originally-received data word 200 to form a new k-bit data word 207, where k is illustratively 11. Data word 207 is then used as an address 209 of a memory—illustratively data cache 105—which comprises $2^k$ records 210 (each comprising one or more words of memory 105) to retrieve and return a corresponding record 210 from memory 105. In this illustrative example, each record 210 contains the call route and data associated with that call route that correspond to the originally-received VPI/VCI.

Figure 3:
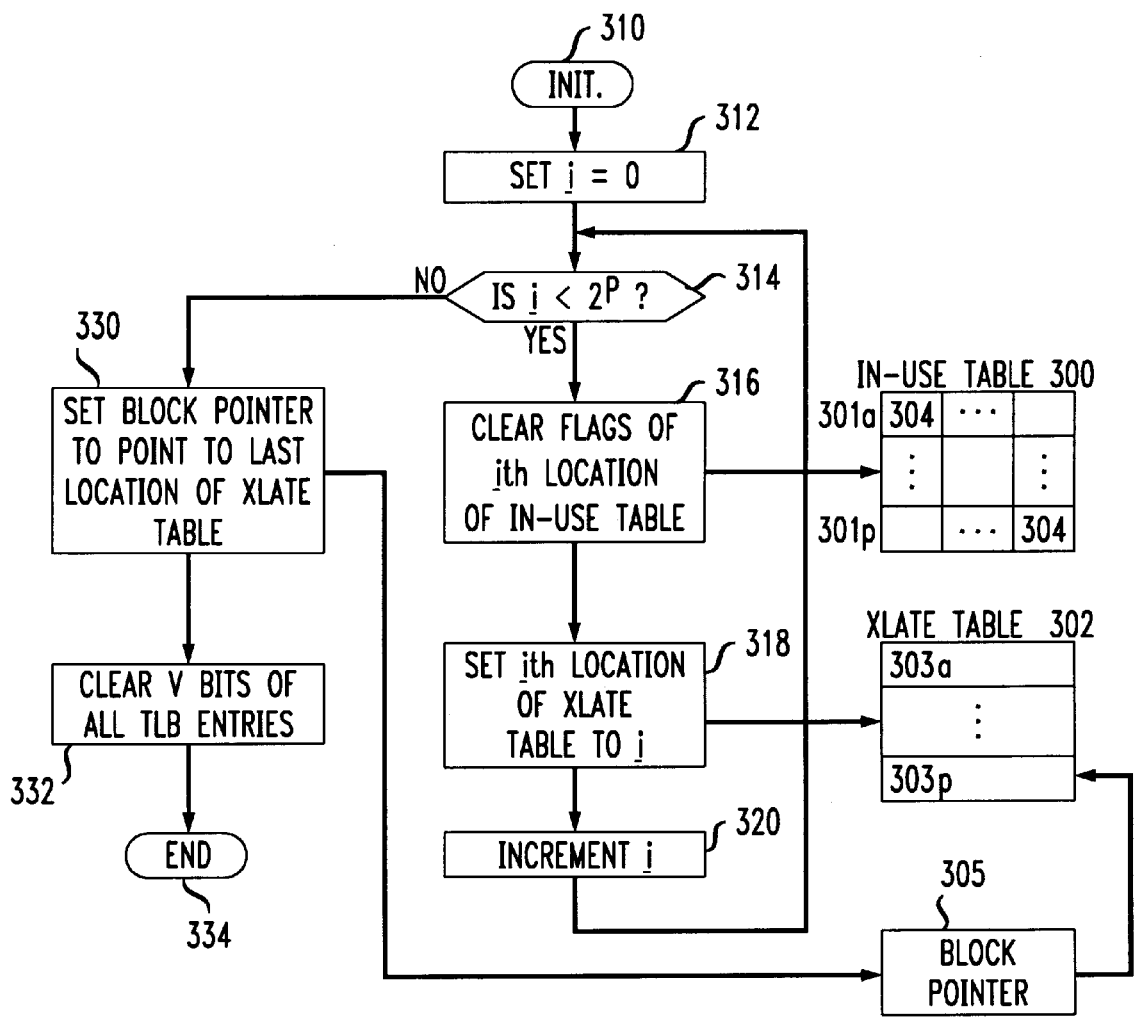
FIG. 3 is a functional flow diagram of a CAM initialization function performed by the microprocessor of FIG. 1.

The routine for initializing MMU 102 for use in the CAM function of FIG. 2 is flowcharted in FIG. 3. MMU 102 uses a pair of tables 300 and 302 in conjunction with TLB 103. An in-use table 300 has a plurality p of locations 301a–301p, one for each entry 206a–206p of TLB 103. Each location 301 comprises a plurality $2^k$ of flags 304, so that, in total, in-use table 300 has one flag 304 for each record 210 in memory 105. Each location 301 indicates whether the corresponding TLB entry 206 is in use, and each flag 304 indicates whether the corresponding record 210 is in use. A translate (Xlate) table 302 has a plurality of locations 303a–303p, one for each entry 206a–206p of TLB 103. Each location 303 has an index into TLB 103 pointing to its presently-corresponding entry 206: Xlate table 302, together with an associated block pointer 305, acts as a stack of presently-unused TLB entries 206. Tables 300 and 302 are illustratively stored in data cache 105. Upon invocation of the initialization procedure, at step 310, CPU 101 initializes a variable i to zero, at step 312, and then checks whether the value of i is less than $2^P$, at step 314, where p is the number of entries in TLB 103. In this illustrative embodiment, TLB 103 comprises 64 entries 206. If the value of i is less than $2^P$, CPU 101 clears all flags 304 of the ith location 301 in table 300 by setting each flag value to 0, at step 316, to indicate that the corresponding TLB entry 206 and records 210 are not in use. CPU 101 also sets the ith location 303 of Xlate table 302 to the value of i, at step 318, thus causing location 303 to point to the ith TLB entry 206 and identify it as an unused entry. CPU 101 then increments the value of i by one, at step 320, and returns to step 314. Hence, by the time the value of i equals $2^P$, all flags 304 of all locations 301 of table 300 are cleared, and locations 303a–303p of table 302 point in sequential order to sequential entries 206a–206p of TLB 103.

Upon determining at step 314 that the value of i equals or exceeds $2^P$, CPU 101 sets block pointer 305 to point to the last location 303p of Xlate table 302, at step 330, and also clears the V bits 205 of all entries 206 of TLB 103 to invalidate all entries 206, at step 332. Initialization is thereby completed, at step 334.

Figure 4:
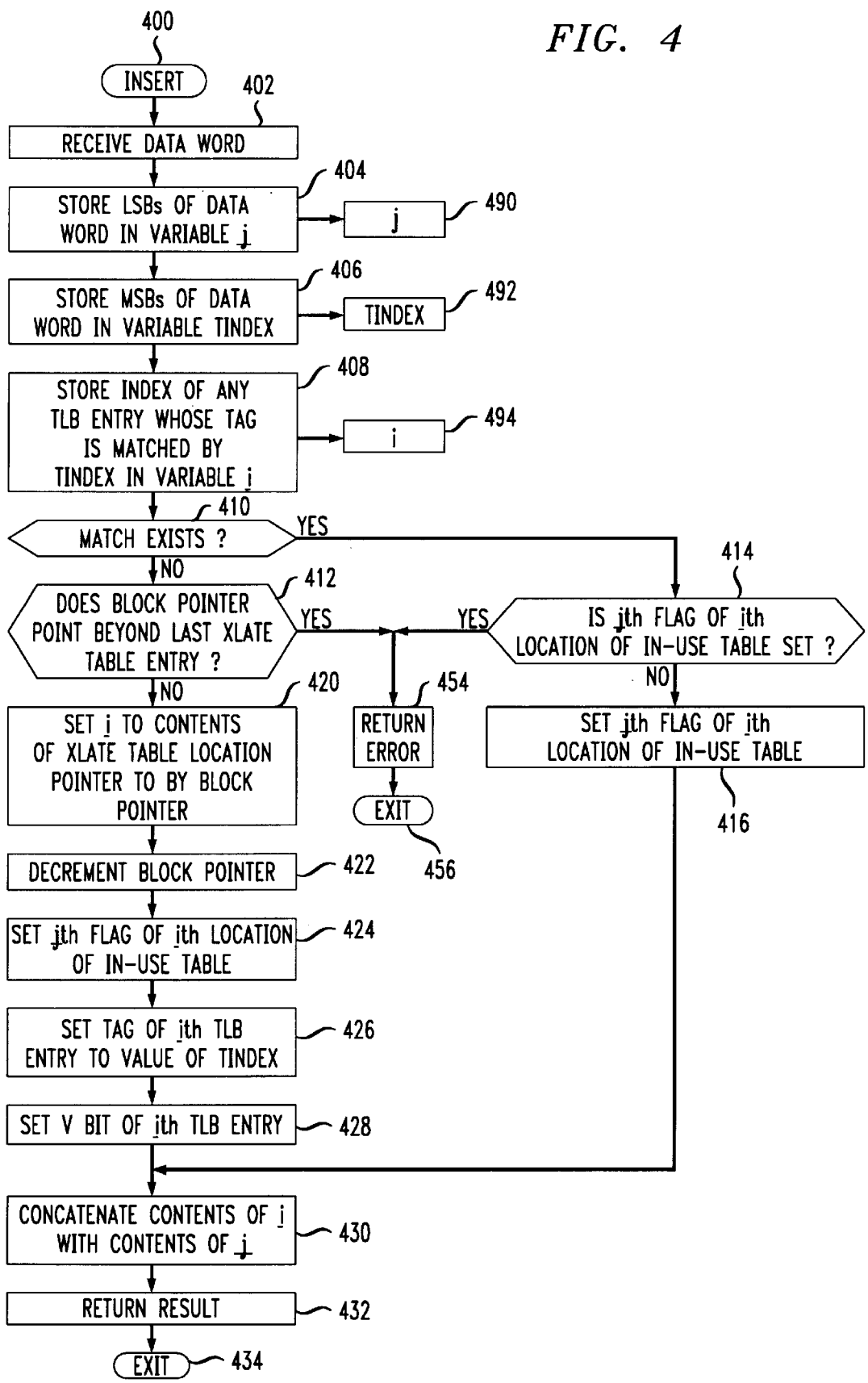
FIG. 4 is a functional flow diagram of a CAM-entry insert function performed by the microprocessor of FIG. 1.

FIG. 4 flowcharts a CAM-entry insert routine which is executed when a new ATM connection is set up, to insert an entry regarding that connection into TLB 103. Upon its invocation, at step 400, CPU 101 receives a new data word 200—the VPI/VCI of the new ATM connection—at step 402, stores its h LSBs 201 in a temporary variable i 490, at step 404, and masks off the h LSBs 201 and stores the remaining MSBs 202 in a temporary variable Tindex 492, at step 406. CPU 101 then uses Tindex 492 as a comparand against TLB 103 and stores index 204 of TLB entry 206—if any—whose tag 203 matches the comparand in temporary variable i 494, at step 408. CPU 101 then checks the value of i 494 to determine therefrom if step 408 produced a match between Tindex 492 and tag 203 of a TLB entry 206, at step 410. If a match does not exist, CPU 101 checks the value of block pointer 305 to see if it points beyond the last location 303p of Xlate table 302, at step 412. If so, TLB 103 is full and has no room for a new entry, and so CPU 101 returns an error indication, at step 454, and exits the insert procedure, at step 456. If block pointer 305 does not point beyond the last location 303p of Xlate table 302, TLB 103 has room for another entry. CPU 101 therefore sets the value of i 494 to the contents of the Xlate table 302 location 303 that is pointed to by block pointer 305, at step 420, decrements block pointer 305 to point to the next location 303 in table 302, at step 422, and sets the ith flag 304 of the ith location 301 of in-use table 300, at step 424, to cause it to indicate that the corresponding record 210 and TLB entry 206, respectively, are now in use. CPU 101 now sets tag 203 of the ith entry 206 of TLB 103 to the value of Tindex 492, at step 426, and also sets V bit 205 of that ith entry 206, at step 428. CPU 101 then concatenates the value of variable i 494 with the value of variable i 490, at step 430, and returns the result, at step 432. This result is a pointer to record 210 that corresponds to the received data word 200. This result will be used by CPU 101 to address the corresponding record 210. CPU 101 then exits the insert procedure, at step 434.

Returning to step 410, if it is determined that there is a match between the value of Tindex 492 and tag 203 of any TLB entry 206, CPU 101 checks the value of the ith flag 304 of the ith location 301 of in-use table 300 to determine if the corresponding record 210 is in use, at step 414. If the corresponding record 210 is in use, CPU 101 proceeds to steps 454 et seq. to return as error. If the corresponding record 210 is not in use, CPU 101 sets the ith flag 304 of the ith location 301 of in-use table 300 to indicate that the corresponding record 210 now is in use, at step 416, and then proceeds to steps 430 et seq. to produce and return a result.

Figure 5:
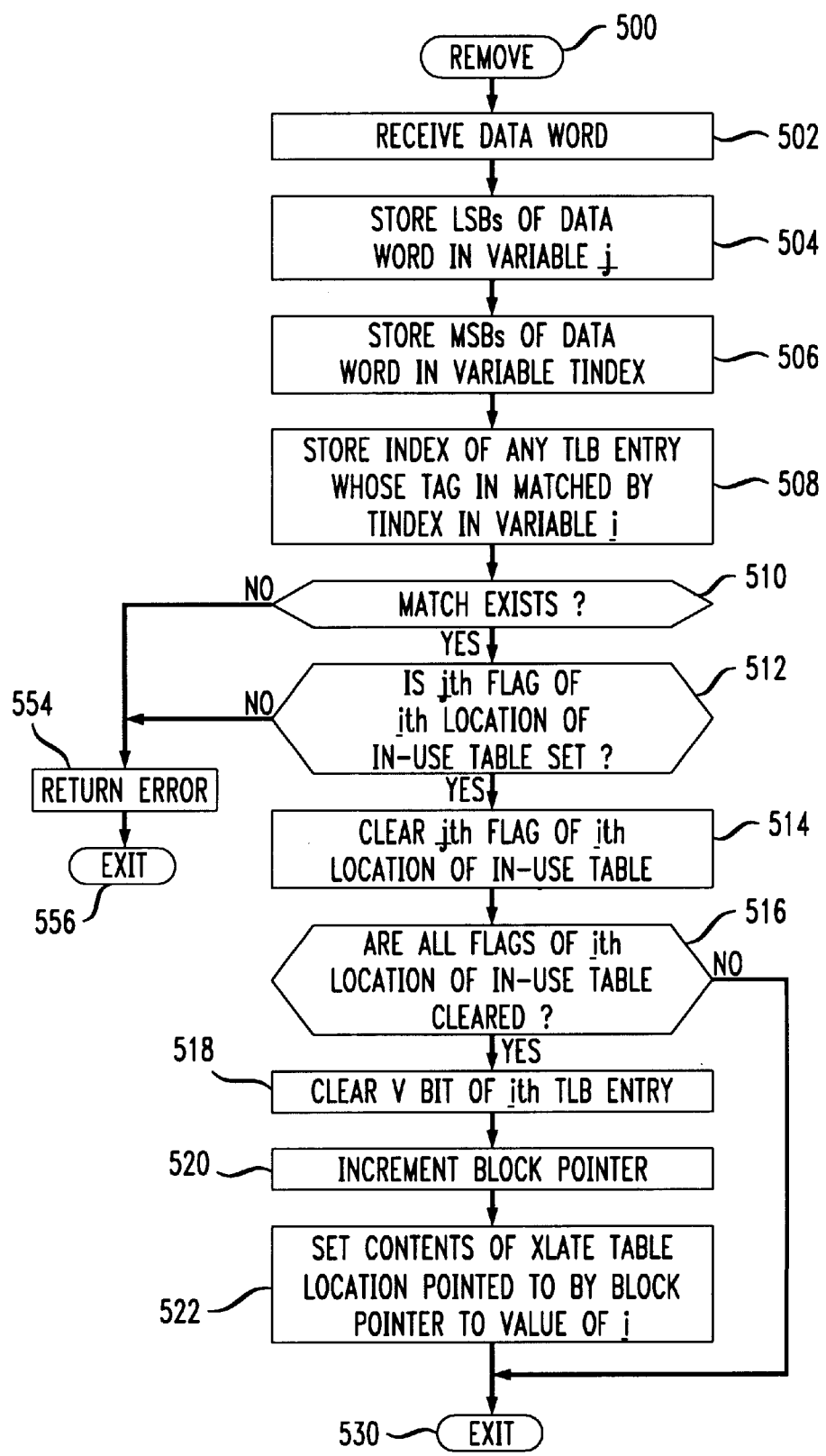
FIG. 5 is a functional flow diagram of a CAM-entry remove function performed by the microprocessor of FIG. 1.

FIG. 5 flowcharts a CAM-entry remove routine which is executed when an existing ATM connection is torn down, to remove the entry regarding that connection from TLB 103. Upon its invocation, at step 500, CPU 101 receives a data word 200—the VPI/VCI of the ATM connection which is being torn down—at step 502, stores its h LSBs 201 in temporary variable i 490, at step 504, and masks off the h LSBs 201 and stores the remaining MSBs 202 in temporary variable Tindex 492, at step 506. CPU 101 then uses Tindex 492 as a comparand against TLB 103 and stores index 204 of TLB entry 206—if any—whose tag 203 matches the comparand in temporary variable i 494, at step 508. CPU 101 checks the value of i 494 to determine therefrom if step 508 produced a match between Tindex 492 and tag 203 of a TLB entry 206, at step 510. If a match does not exist, TLB 103 does not have an entry that corresponds to the connection which is being torn down, so CPU 101 returns in error, at step 554, and then exits the remove routine, at step 556.

If a match is found to exist at step 510, CPU 101 checks the ith flag 304 of the ith location 301 of in-use table 300 to determine if the corresponding record 210 is in use, at step 512. If the corresponding record 210 is not in use, CPU 201 returns an error indication, at step 554, and exits the remove procedure, at step 556. If the checked flag 304 is set, indicating that the corresponding record 210 is in use, CPU 101 clears flag 304, at step 514, and then checks whether all flags 304 of the ith location 301 of in-use table 300 are cleared, at step 516. If they are not all cleared, the location's corresponding TLB entry 206 is still in use, and so CPU 101 exits the remove routine, at step 530. If, however, all the flags 304 of the checked location 301 are cleared, it indicates that the location's corresponding TLB entry 206 is not in use. CPU 101 therefore clears V bit 205 of the ith TLB entry 206 to invalidate the entry, at step 518, increments block pointer 305 to point to the next location 303 of Xlate table 302, at step 520, and sets the contents of location 303 of Xlate table 302 that is pointed to by block pointer 305 to the value of i 494, at step 522, thereby returning the TLB entry 206 indexed by the value of i 494 to the list of unused TLB entries. CPU 101 then exits the remove procedure, at step 530.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A content-addressable memory (CAM) comprising:
   a first memory;
   a microprocessor connected to the first memory and having an internal memory management unit for translating virtual memory addresses into physical memory addresses that includes a translation buffer in the form of an associative second memory having a plurality of entries, each entry for indicating a corresponding portion of the physical memory and having a corresponding tag for indicating a corresponding portion of the virtual memory; and
   the microprocessor further having a program execution unit programmed, in an absence of use of the internal memory management unit for the translating of the virtual memory addresses into the physical memory addresses, to be responsive to receipt of a word of data that excludes a virtual memory address and comprises most-significant bits and least-significant bits by applying the most-significant bits as a comparand to the tags which indicate words of data that both correspond to the tags and exclude virtual memory addresses, to obtain an index indicative of which translation buffer entry's corresponding tag matches the comparand, and responsive to obtaining of the index by combining the index with the least-significant bits of the received word to form an address of the first memory.

2. The CAM of claim 1 wherein:
   the first memory comprises a plurality of addressable records; and
   the program execution unit forms the address for application to the first memory to retrieve a record that is addressed by the address.

3. The CAM of claim 1 wherein:
   the first memory is an internal memory of the microprocessor and stores a plurality of records; and
   the program execution unit applies the address to the internal memory to retrieve from the internal memory a record that is addressed by the address.

4. The CAM of claim 3 wherein:
   the internal memory is a data cache of the microprocessor.

5. The CAM of claim 1 wherein:
   the program execution unit comprises
   a processing unit for executing a program; and
   an internal memory of the microprocessor connected to the processing unit and storing the program for execution by the processing unit.

6. The CAM of claim 5 wherein:
   the internal memory is an instruction cache of the microprocessor.

7. The CAM of claim 2 wherein:
   the received word is an identifier of an asynchronous transfer mode (ATM) network connection; and
   the record defines a route of the connection through the ATM network.

8. The CAM of claim 1 wherein:
   the program execution unit is further programmed to respond to receipt of a second word of data comprising most-significant second bits and least-significant second bits by applying the most-significant second bits as a second comparand to the tags of the translation buffer entries to obtain a second index identifying which if any translation buffer entry's corresponding tag matches the second comparand, to respond to obtaining of a second index identifying an individual translation buffer entry as having a corresponding tag that matches the second comparand by checking a use field corresponding to the least-significant second bits of a use entry corresponding to the second index of a map of use of the first memory to determine if the record that corresponds to the checked use field is in use, to respond to a determination that the record that corresponds to the checked use field is in use by giving an indication thereof, to respond to a determination that the record that corresponds to the checked use field is not in use by causing the checked use field to indicate that the corresponding record is in use, to respond to obtaining of a second index identifying no translation buffer entry as having a corresponding tag that matches the second comparand by determining whether all translation buffer entries are in use, to respond to a determination that all translation buffer entries are in use by giving an indication thereof, to respond to a determination that all translation buffer entries are not in use by selecting an unused individual translation buffer entry, causing the use field corresponding to the least-significant second bits of a use entry corresponding to the individual translation buffer entry of the map of use of the first memory to indicate that the corresponding record is in use, and setting the tag of the individual translation buffer entry to match the most-significant second bits.

9. The CAM of claim 8 wherein:

the program execution unit is further programmed to respond to receipt of a third word of data comprising most-significant third bits and least-significant third bits by applying the most-significant third bits as a third comparand to the tags of the translation buffer entries to obtain a third index identifying which if any translation buffer entry's corresponding tag matches the third comparand, to respond to obtaining of a third index identifying no translation buffer entry as having a corresponding tag that matches the third comparand by giving an indication thereof, to respond to obtaining of a third index identifying a second individual translation buffer entry as having a corresponding tag that matches the third comparand by checking a use field corresponding to the least-significant third bits of a second use entry corresponding to the third index of the map of use of the first memory to determine if the record that corresponds to the checked second use field is in use, to respond to a determination that the record that corresponds to the checked second use field is not in use by giving an indication thereof, to respond to a determination that the record that corresponds to the checked second use field is in use by causing the checked second use field to indicate that the corresponding record is not in use and determining whether all use fields of the second use entry indicate that the corresponding records are not in use, and to respond to a determination that all use fields of the second use entry indicate that the corresponding records are not in use by marking the second translation buffer entry as not being in use.

10. A method of operating as a content-addressable memory (CAM) a first memory comprising a plurality of addressable records and a microprocessor connected to the first memory and having an internal memory management unit for translating virtual memory addresses into physical memory addresses that includes a translation buffer in the form of an associative second memory having a plurality of entries, each entry for indicating a corresponding portion of the physical memory and having a corresponding tag for indicating a corresponding portion of the virtual memory, comprising the steps of:

responsive, in an absence of use of the internal memory management unit for the translating of the virtual memory addresses into the physical memory addresses, to receipt of a word of data that excludes a virtual memory address and comprises most-significant bits and least-significant bits, the microprocessor applying the most-significant bits as a comparand to the tags which indicate words of data that both correspond to the tags and exclude virtual memory addresses, to obtain an index indicative of which translation buffer entry's corresponding tag matches the comparand;

responsive to obtaining of the index, the microprocessor combining the index with the least-significant bits of the received word to form an address of the first memory; and applying the address to the first memory to retrieve a record that is addressed by the address.

11. The method of claim 10 wherein:

the first memory is an internal memory of the microprocessor and stores a plurality of records; and the step of applying comprises the step of
the microprocessor applying the address to the internal memory to retrieve from the internal memory a record that is addressed by the address.

12. The method of claim 11 wherein:

the internal memory is a data cache of the microprocessor.

13. The method of claim 10 wherein:

the microprocessor performs the method steps by executing a program stored in an internal memory of the microprocessor.

14. The method of claim 13 wherein:

the internal memory is an instruction cache of the microprocessor.

15. The method of claim 10 wherein:

the received word is an identifier of an asynchronous transfer mode (ATM) network connection; and the addressed record defines a route of the connection through the ATM network.

16. The method of claim 10 further comprising the steps of:

in response to receipt of a second word of data comprising most-significant second bits and least-significant second bits, applying the most-significant second bits as a second comparand to the tags of the translation buffer entries to obtain a second index identifying which if any translation buffer entry's corresponding tag matches the second comparand;

in response to obtaining a second index identifying an individual translation buffer entry as having a corresponding tag that matches the second comparand, checking a use field corresponding to the least-significant second bits of a use entry corresponding to the second index of a map of use of the first memory to determine if the record that corresponds to the checked use field is in use;

in response to a determination that the record that corresponds to the checked use field is in use, giving an indication thereof;

in response to a determination that the record that corresponds to the checked use field is not in use, causing the checked use field to indicate that the corresponding record is in use;

in response to obtaining a second index identifying no translation buffer entry as having a corresponding tag that matches the second comparand, determining whether all translation buffer entries are in use;

in response to a determination that all translation buffer entries are in use, giving an indication thereof; and in response to a determination that all translation buffer entries are not in use, selecting an unused individual translation buffer entry, causing the use field corresponding to the least-significant second bits of a use entry corresponding to the individual translation buffer entry of the map of use of the first memory to indicate that the corresponding record is in use, and setting the tag of the individual translation buffer entry to match the most-significant second bits.

17. The method of claim 16 further comprising the steps of:

in response to receipt of a third word of data comprising most-significant third bits and least-significant third bits, applying the most-significant third bits as a third comparand to the tags of the translation buffer entries to obtain a third index identifying which if any translation buffer entry's corresponding tag matches the third comparand;

in response to obtaining a third index identifying no translation buffer entry as having a corresponding tag that matches the third comparand, giving an indication thereof;

in response to obtaining a third index identifying a second individual translation buffer entry as having a corresponding tag that matches the third comparand, checking a use field corresponding to the least-significant third bits of a second use entry corresponding to the third index of the map of use of the first memory to determine if the record that corresponds to the checked second use field is in use;

in response to a determination that the record that corresponds to the checked second use field is not in use, giving an indication thereof;

in response to a determination that the record that corresponds to the checked second use field is in use, causing the checked second use field to indicate that the corresponding record is not in use, and determining whether all use fields of the second use entry indicate that the corresponding records are not in use; and in response to a determination that all use fields of the second use entry indicate that the corresponding records are not in use, marking the second translation buffer entry as not being in use.

18. A content-addressable memory (CAM) comprising:

a first memory;

a microprocessor connected to the first memory and having an internal memory management unit that includes a translation buffer in the form of an associative second memory having a plurality of entries and each entry having a corresponding tag; and the microprocessor further having a program execution unit programmed to be responsive to receipt of a word of data comprising most-significant bits and least-significant bits by applying the most-significant bits as a comparand to the tags to obtain an index indicative of which translation buffer entry's corresponding tag matches the comparand, and responsive to obtaining of the index by combining the index with the least-significant bits of the received word to form an address of the first memory, the program execution unit being further programmed to respond to receipt of a second word of data comprising most-significant second bits and least-significant second bits by applying the most-significant second bits as a second comparand to the tags of the translation buffer entries to obtain a second index identifying which if any translation buffer entry's corresponding tag matches the second comparand, to respond to obtaining of a second index identifying an individual translation buffer entry as having a corresponding tag that matches the second comparand by checking a use field corresponding to the least-significant second bits of a use entry corresponding to the second index of a map of use of the first memory to determine if the record that corresponds to the checked use field is in use, to respond to a determination that the record that corresponds to the checked use field is in use by giving an indication thereof, to respond to a determination that the record that corresponds to the checked use field is not in use by causing the checked use field to indicate that the corresponding record is in use, to respond to obtaining of a second index identifying no translation buffer entry as having a corresponding tag that matches the second comparand by determining whether all translation buffer entries are in use, to respond to a determination that all translation buffer entries are in use by giving an indication thereof, to respond to a determination that all translation buffer entries are not in use by selecting an unused individual translation buffer entry, causing the use field corresponding to the least-significant second bits of a use entry corresponding to the individual translation buffer entry of the map of use of the first memory to indicate that the corresponding record is in use, and setting the tag of the individual translation buffer entry to match the most-significant second bits.

19. The CAM of claim 18 wherein:

the program execution unit is further programmed to respond to receipt of a third word of data comprising most-significant third bits and least-significant third bits by applying the most-significant third bits as a third comparand to the tags of the translation buffer entries to obtain a third index identifying which if any translation buffer entry's corresponding tag matches the third comparand, to respond to obtaining of a third index identifying no translation buffer entry as having a corresponding tag that matches the third comparand by giving an indication thereof, to respond to obtaining of a third index identifying a second individual translation buffer entry as having a corresponding tag that matches the third comparand by checking a use field corresponding to the least-significant third bits of a second use entry corresponding to the third index of the map of use of the first memory to determine if the record that corresponds to the checked second use field is in use, to respond to a determination that the record that corresponds to the checked second use field is not in use by giving an indication thereof, to respond to a determination that the record that corresponds to the checked second use field is in use by causing the checked second use field to indicate that the corresponding record is not in use and determining whether all use fields of the second use entry indicate that the corresponding records are not in use, and to respond to a determination that all use fields of the second use entry indicate that the corresponding records are not in use by marking the second translation buffer entry as not being in use.

20. A method of operating a first memory comprising a plurality of addressable records and a microprocessor connected to the first memory and having an internal memory management unit that includes a translation buffer in the form of an associative second memory having a plurality of entries and each entry having a corresponding tag as a content-addressable memory (CAM), comprising the steps of:

responsive to receipt of a word of data comprising most-significant bits and least-significant bits, the microprocessor applying the most-significant bits as a comparand to the tags to obtain an index indicative of which translation buffer entry's corresponding tag matches the comparand;

responsive to obtaining of the index, the microprocessor combining the index with the least-significant bits of the received word to form an address of the first memory;

applying the address to the first memory to retrieve a record that is addressed by the address;

in response to receipt of a second word of data comprising most-significant second bits and least-significant second bits, applying the most-significant second bits as a second comparand to the tags of the translation buffer entries to obtain a second index identifying which if any translation buffer entry's corresponding tag matches the second comparand;

in response to obtaining a second index identifying an individual translation buffer entry as having a corresponding tag that matches the second comparand, checking a use field corresponding to the least-significant second bits of a use entry corresponding to the second index of a map of use of the first memory to determine if the record that corresponds to the checked use field is in use;

in response to a determination that the record that corresponds to the checked use field is in use, giving an indication thereof;

in response to a determination that the record that corresponds to the checked use field is not in use, causing the checked use field to indicate that the corresponding record is in use;

in response to obtaining a second index identifying no translation buffer entry as having a corresponding tag that matches the second comparand, determining whether all translation buffer entries are in use;

in response to a determination that all translation buffer entries are in use, giving an indication thereof; and in response to a determination that all translation buffer entries are not in use, selecting an unused individual translation buffer entry, causing the use field corresponding to the least-significant second bits of a use entry corresponding to the individual translation buffer entry of the map of use of the first memory to indicate that the corresponding record is in use, and setting the tag of the individual translation buffer entry to match the most-significant second bits.

21. The method of claim 20 further comprising the steps of:

in response to receipt of a third word of data comprising most-significant third bits and least-significant third bits, applying the most-significant third bits as a third comparand to the tags of the translation buffer entries to obtain a third index identifying which if any translation buffer entry's corresponding tag matches the third comparand;

in response to obtaining a third index identifying no translation buffer entry as having a corresponding tag that matches the third comparand, giving an indication thereof;

in response to obtaining a third index identifying a second individual translation buffer entry as having a corresponding tag that matches the third comparand, checking a use field corresponding to the least-significant third bits of a second use entry corresponding to the third index of the map of use of the first memory to determine if the record that corresponds to the checked second use field is in use;

in response to a determination that the record that corresponds to the checked second use field is not in use, giving an indication thereof;

in response to a determination that the record that corresponds to the checked second use field is in use, causing the checked second use field to indicate that the corresponding record is not in use, and determining whether all use fields of the second use entry indicate that the corresponding records are not in use; and in response to a determination that all use fields of the second use entry indicate that the corresponding records are not in use, marking the second translation buffer entry as not being in use.

* * * * *